(12) United States Patent
Fischer et al.

(10) Patent No.: US 11,351,949 B2
(45) Date of Patent: Jun. 7, 2022

(54) ROOF-MOUNTED OCCUPANT RESTRAINT SYSTEM

(71) Applicant: ZF Passive Safety Systems US Inc., Washington, MI (US)

(72) Inventors: Kurt F. Fischer, Rochester, MI (US); Alexandra E. Smith, Richmond, MI (US); Werner Freisler, Schwaebisch Gmuend (DE); Douglas M. Gould, Lake Orion, MI (US); Tobias Klenk, Boebingen (DE); Hylus Ranjit Raj Jayakar, Shelby Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 16/975,728

(22) PCT Filed: Dec. 4, 2018

(86) PCT No.: PCT/US2018/063754
§ 371 (c)(1),
(2) Date: Aug. 26, 2020

(87) PCT Pub. No.: WO2019/168580
PCT Pub. Date: Sep. 6, 2019

(65) Prior Publication Data
US 2020/0406852 A1 Dec. 31, 2020

Related U.S. Application Data

(60) Provisional application No. 62/730,581, filed on Sep. 13, 2018, provisional application No. 62/666,771, (Continued)

(51) Int. Cl.
*B60R 21/233* (2006.01)
*B60R 21/214* (2011.01)
(Continued)

(52) U.S. Cl.
CPC .......... *B60R 21/233* (2013.01); *B60R 21/214* (2013.01); *B60R 21/216* (2013.01);
(Continued)

(58) Field of Classification Search
CPC ... B60R 21/233; B60R 21/214; B60R 21/216; B60R 21/2338; B60R 21/26;
(Continued)

(56) References Cited

U.S. PATENT DOCUMENTS 10,953,835 B2 * 3/2021 Gould ................ B60R 21/214
2003/0218319 A1 11/2003 Amaori
(Continued)

FOREIGN PATENT DOCUMENTS

JP           201630546        3/2016
WO       WO-2019169209 A1 *  9/2019  .......... B60R 21/214

*Primary Examiner* — Drew J Brown
(74) *Attorney, Agent, or Firm* — Tarolli, Sundheim, Covell & Tummino LLP (57) ABSTRACT

A restraint system (10) for helping to protect an occupant (60) of a vehicle (20) having a seat (50) for the occupant (60) includes a primary airbag (70) having a stored condition within a roof (32) and being inflatable to a deployed condition aligned with the seat (50). A support airbag (76) has a stored condition within the roof (32) and is inflatable to a deployed condition engaging the primary airbag (70).

14 Claims, 9 Drawing Sheets

Related U.S. Application Data filed on May 4, 2018, provisional application No. 62/661,667, filed on Apr. 24, 2018, provisional application No. 62/636,899, filed on Mar. 1, 2018.

(51) Int. Cl.
*B60R 21/216* (2011.01)
*B60R 21/2338* (2011.01)
*B60R 21/26* (2011.01)
*B60R 21/215* (2011.01)
*B60R 21/231* (2011.01)

(52) U.S. Cl.
CPC .......... *B60R 21/2338* (2013.01); *B60R 21/26* (2013.01); *B60R 2021/21537* (2013.01); *B60R 2021/23107* (2013.01); *B60R 2021/23153* (2013.01); *B60R 2021/23161* (2013.01); *B60R 2021/23382* (2013.01); *B60R 2021/26058* (2013.01)

(58) Field of Classification Search
CPC .......... B60R 2021/21537; B60R 2021/23107; B60R 2021/23153; B60R 2021/23161; B60R 2021/23382; B60R 2021/26058; B60R 21/16
See application file for complete search history.

(56) References Cited

U.S. PATENT DOCUMENTS

| | | |
|---|---|---|
| 2004/0232666 A1 | 11/2004 | Sato et al. |
| 2008/0054602 A1 | 3/2008 | Yang |
| 2010/0301591 A1 | 12/2010 | Kwon et al. |
| 2017/0113646 A1 | 4/2017 | Lee et al. |
| 2019/0161048 A1* | 5/2019 | Thomas ................ B60R 21/215 |
| 2020/0122665 A1* | 4/2020 | Shin .................. B60R 21/01512 |
| 2021/0031718 A1* | 2/2021 | Schultz ................ B60R 21/231 |

* cited by examiner

ROOF-MOUNTED OCCUPANT RESTRAINT SYSTEM

CROSS REFERENCE TO RELATED APPLICATIONS

This application is a national stage of International Application No. PCT/US2018/063754, filed Dec. 4, 2018, which claims benefit of U.S. Provisional Appln. Nos. 62/636,899, filed Mar. 1, 2018, 62/661,667, filed Apr. 24, 2018, 62/666,771, filed May 4, 2018, and 62/730,581, filed Sep. 13, 2018. The disclosures of these applications are incorporated herein by reference in their entireties.

TECHNICAL FIELD

The present invention relates generally to vehicle airbags and, in particular, relates to a roof-mounted primary airbag with a support airbag.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free to utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

In one example, a restraint system for helping to protect an occupant of a vehicle having a roof and a cabin with a seat for the occupant includes a primary airbag having a stored condition within the roof and being inflatable to a deployed condition extending into the cabin and aligned with the seat. A support airbag has a stored condition within the roof and is inflatable to a deployed condition engaging the primary airbag.

In another example, a restraint system for helping to protect an occupant of a vehicle having a roof and a cabin with a seat for the occupant includes a primary airbag having a stored condition within the roof and being inflatable to a deployed condition extending into the cabin and aligned with the seat. The primary airbag includes a first portion defining a first chamber. A second portion defines a second chamber. A folded portion extends between the first and second portions and has an inverted condition. A tether connected to the folded portion and an inner wall of the primary airbag maintains the folded portion in the inverted condition during deployment of the primary airbag. A first inflator provides inflation fluid to the primary airbag at a first fluid pressure. A support airbag has a stored condition within the roof and is inflatable to a deployed condition engaging the primary airbag. A second inflator provides inflation fluid to the support airbag at a second fluid pressure greater than the first fluid pressure such that the support airbag restricts movement of the primary airbag away from the occupant in response to occupant penetration into the primary airbag.

Other objects and advantages and a fuller understanding of the invention will be had from the following detailed description and the accompanying drawings.

DETAILED DESCRIPTION

Figure 1:
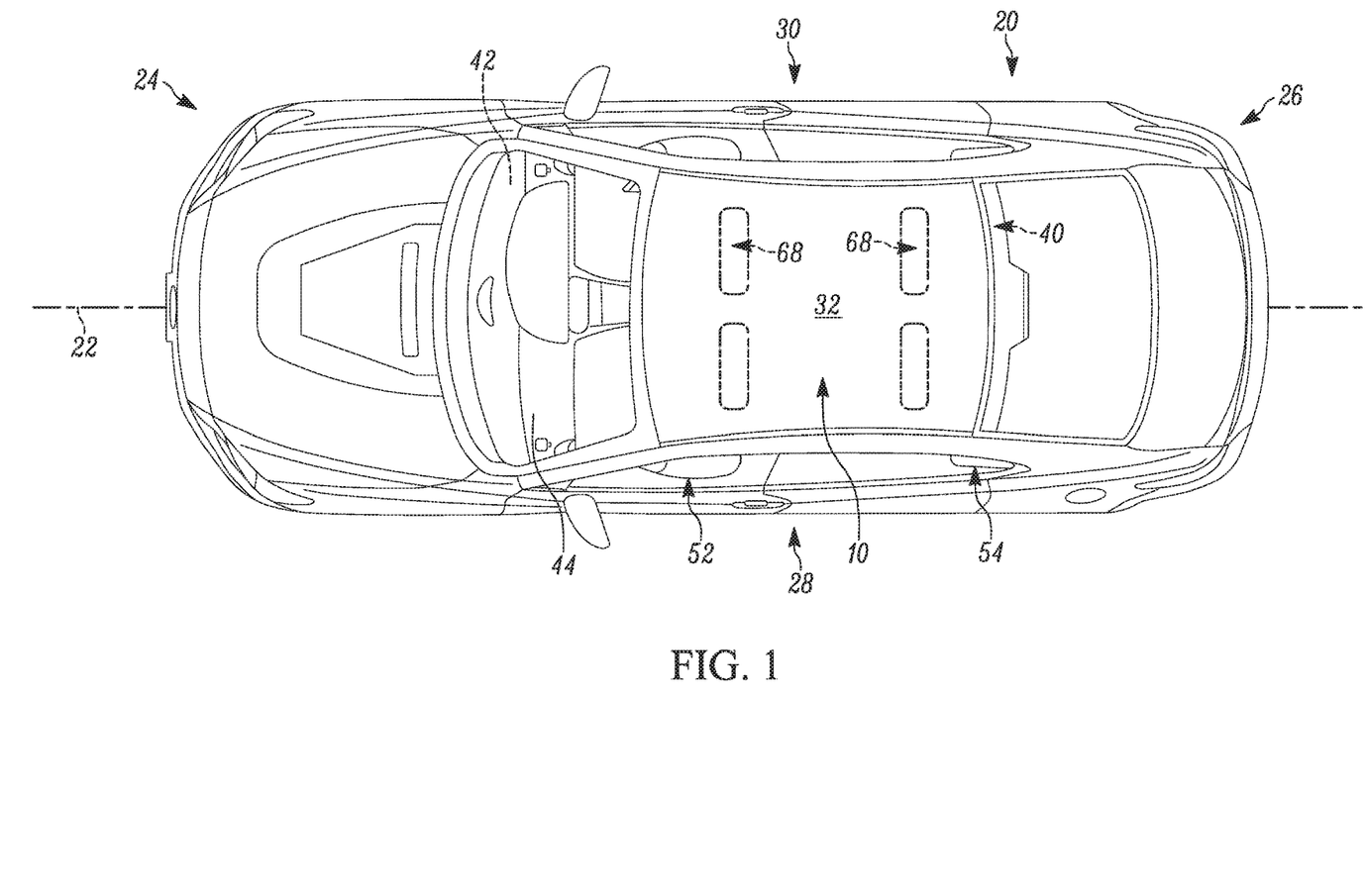
FIG. 1 is a top view of a vehicle including an example roof-mounted, occupant restraint system.
Figure 2:
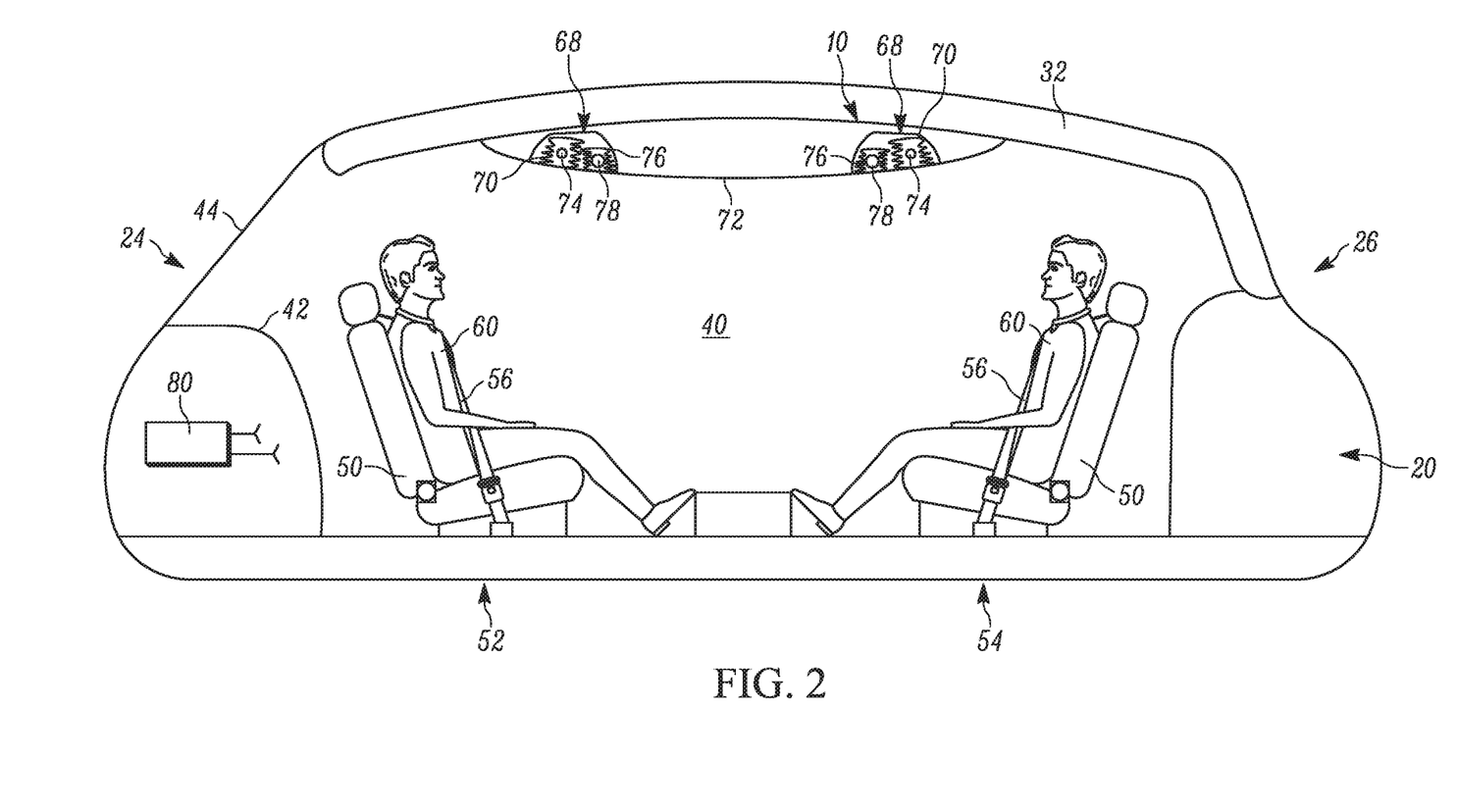
FIG. 2 is a schematic illustration of a cabin of the vehicle with airbags of the restraint system in a stored condition.

The present invention relates generally to vehicle airbags and, in particular, relates to a roof-mounted primary airbag with a support airbag. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 can be located between the instrument panel 42 and the roof 32.

The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, facing each other, with the front row facing rearward toward the rear row. Alternatively, the front and rear rows 52 and 54 can both be arranged in a forward-facing manner (not shown), similar to that of conventional automobiles. In either case, each seat 50 is fitted with a seatbelt 56 for restraining its occupant 60. Control interfaces for climate controls, GPS, navigation, entertainment, etc. can, for example, be provided in a center console area of the vehicle 20 located between the occupants 60 of the front and/or rear rows 52, 54.

For the unconventional, forward-rearward seating arrangement of FIG. 2, in the event of a frontal crash, the occupants 60 of the forward-facing rear row 54 are restrained by their respective seatbelts 56. Occupants 60 of the rear-facing front row 52, while buckled, are supported in a frontal crash by the seatbacks of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for head and neck support.

Since the front row 52 need not face forward and need not be in close proximity to the instrument panel 42 or the area where an instrument panel would normally reside, there can be a large volume of space between the front row 52 and the forward cabin structure presented facing the front row. Because of this, it may not be efficient to deploy airbags from this location due to the large volume that the airbags would need to occupy. This would present problems in sizing the airbag(s) and inflator(s) to occupy that large volume and could also present problems in deploying the airbag(s) into that large volume in the necessary short time required to protect the occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel, presents additional challenges.

With this in mind, the occupant restraint system 10 shown in FIGS. 1-2 includes at least one airbag module 68 for placement along the roof 32 of the vehicle 20. Each airbag module 68 includes a vehicle occupant protection device in the form of a primary inflatable curtain airbag 70, an inflatable support airbag 76, and inflators 74, 78 for providing inflation fluid to the primary and support airbags, respectively. Alternatively, the primary airbag 70 and inflator 74 can be provided in a separate airbag module 68 from the support airbag 76 and inflator 78 (not shown).

Mounting the airbag modules 68 in the vehicle roof 32 is convenient because the primary airbags 70 can be positioned in locations with a desired proximity to the occupants 60 they are intended to help protect. This can help reduce the necessary inflatable volume of the primary airbags 70 and can also help provide a desired airbag deployment time without requiring an excessively high-volume inflator. The airbag modules 68 are housed/concealed in the roof structure of the vehicle 20 behind, for example, a roof liner 72. The airbags 70, 76 are at least one of rolled and folded before being placed in the airbag module 68 behind the roof liner 72.

The inflators 74, 78 are operatively connected (e.g., by wires) to an airbag controller 80 (see FIG. 2) that includes or communicates with one or more crash sensors (not shown). The airbag controller 80 is operative to determine the occurrence of a crash event and to actuate the inflators 74, 78 in a known manner to inflate the airbags 70, 76. The inflators 74, 78 can be of any known type, such as stored gas, solid propellant, augmented or hybrid. Regardless, the inflator 74 supplies inflation fluid to the primary airbag 70 at a first fluid pressure. The inflator 78 supplies inflation fluid to the support airbag 76 at a second fluid pressure greater than the first fluid pressure.

The airbags 70, 76 can be constructed of any suitable material, such as nylon (e.g., woven nylon 6-6 yarns), and may be constructed in any suitable manner. For example, the airbag 70 may include one or more pieces or panels of material. If more than one piece or panel is used, the pieces or panels can be interconnected by known means, such as stitching, ultrasonic welding, heat bonding, or adhesives, to form the airbags 70, 76. The airbags 70, 76 can be uncoated, coated with a material, such as a gas impermeable urethane, or laminated with a material, such as a gas impermeable film. The airbags 70, 76 can therefore have a gas-tight or substantially gas-tight construction. Those skilled in the art will appreciate that alternative materials, such as polyester yarn, and alternative coatings, such as silicone, may also be used to construct the airbags 70, 76.

The occupant restraint system 10 can include multiple airbag modules 68 provided along the roof 32 and within the roof liner 72 at locations associated and aligned with each seat 50 in each row 52, 54. In other words, each seat 50 in the vehicle 20 can have an individual airbag module 68 associated therewith and, thus, each seat can have individual airbags 70, 76 (and corresponding inflators 74, 78) associated and aligned therewith. In each case, the airbag 70 is positioned in front of the associated seat 50 in each row 52, 54 in the direction the occupants 60 in those seats would face (i.e., rearward of the front row 52 and forward of the rear row 54). The associated support airbag 76 is positioned on the side of the primary airbag 70 opposite the seat 50 such that the primary airbag is positioned between the seat and the support airbag.

The airbags 70 extend in the left-to-right direction of the vehicle 20 generally parallel to the width of the seats 50. Alternatively, a single airbag 70 can span the entire width of the cabin 40 to protect all the occupants 60 in an entire row 52 or 54 (not shown). In the example shown in FIG. 2, the airbag modules 68 are provided behind the roof liner 72 and associated with each seat 50 in each row 52, 54. The airbag modules 68 are identical and, thus, the construction and operation of only the airbag module associated with a seat 50 in the rear row 54 is discussed for brevity.

Figure 3A:
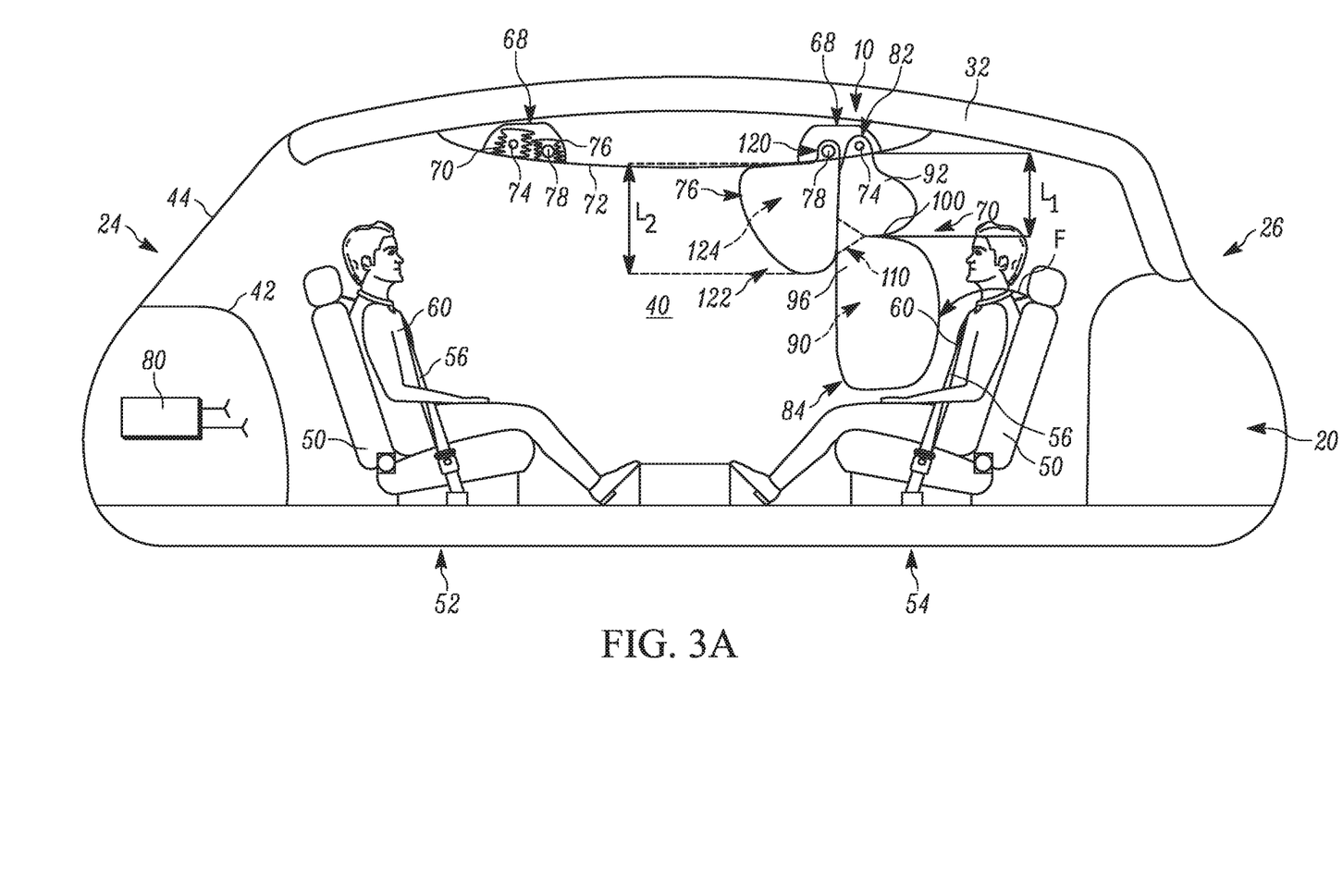
FIG. 3A is a schematic illustration of the cabin of the vehicle with the airbags in a deployed condition.

As shown in FIG. 3A, upon sensing the occurrence of an event for which inflation of the airbag 70 is desired, such as a vehicle collision, the controller 80 provides signals to the inflators 74, 78. Upon receiving the signals from the controller 80, the inflators 74, 78 are actuated and provide inflation fluid to the inflatable volumes of the airbags 70, 76 in a known manner. The inflating airbags 70, 76 exert a force on the roof liner 72, which causes the roof liner to open (e.g., via tear seam or door). This releases the airbags 70, 76 to inflate and deploy from stored conditions behind the roof liner 72 to deployed conditions extending into the cabin 40 forward of and aligned with the seat 50 in the rear row 54. The airbags 70, 76, while inflated, help protect the vehicle occupant 60 in the rear row 54 by absorbing the impact of the occupant.

The primary airbag 70, when deployed, extends from an upper end 82 to a lower end 84 and defines an inflatable volume 90. The upper end 82 is connected to the vehicle 20 and fluidly connected to the inflator 74. The lower end 84 is positioned adjacent an occupant 60 in the rear row 54. The primary airbag 70 includes an upper portion 92 defining an upper inflatable chamber 94. The upper portion 92 extends into the cabin 40 a distance $L_1$ below the roof liner 72.

Figure 3B:
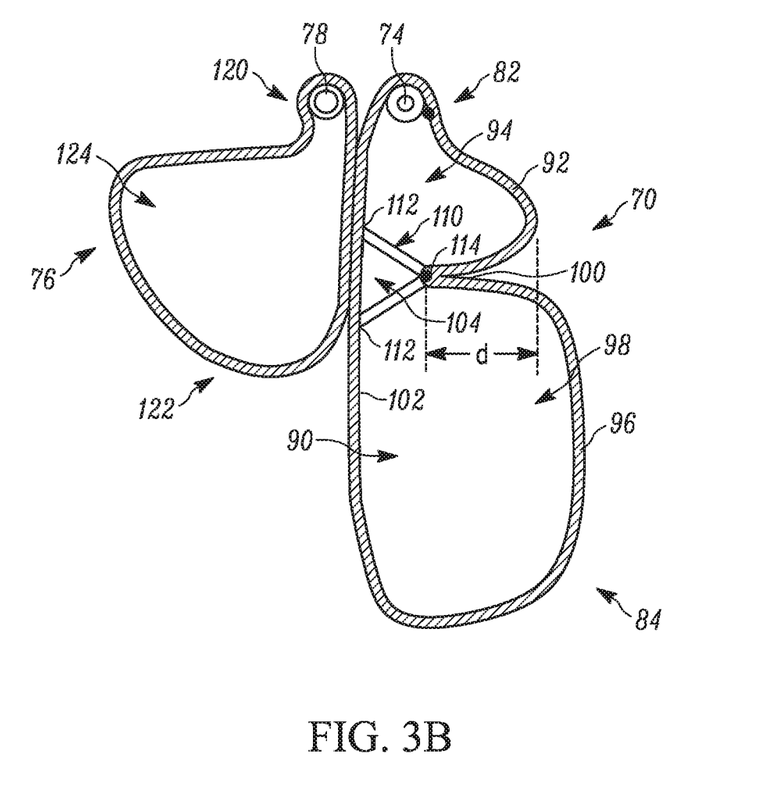
FIG. 3B is an enlarged sectional view of a portion of the airbags of FIG. 3A.

A lower portion 96 of the primary airbag 70 defines a lower inflatable chamber 98 (see FIG. 3B). A folded portion 100 extends a depth d into the inflatable volume 90 towards an inner wall 102 of the primary airbag 70. The folded portion 100 separates the upper and lower inflatable chambers 94, 98 and is formed as an inverted portion of the primary airbag 70 material. The folded portion 100 forms a restriction 104 or reduced cross-sectional area of the primary airbag 70 between the chambers 94, 98 and acts as an indentation for reducing loads on the primary airbag.

A tether 110 connects the folded portion 100 to the inner wall 102 to maintain the folded portion 100 in the inverted condition. To this end, the tether 110 extends between a pair of ends 112 and includes a portion 114 between the ends secured to the inverted folded portion 100. The tether 110 is formed from a single piece of inextensible material. Alternatively, the tether 110 can be formed as two pieces, each including one of the ends 112 and secured to the folded portion 100.

The support airbag 76 extends from an upper end 120 to a lower end 122 and defines an inflatable volume 124. The upper end 120 is connected to the vehicle 20 and fluidly connected to the inflator 78. The upper end 120 abuts or deploys adjacent to the roof liner 72. As shown, the lower end 122 extends into the cabin 40 to a position below the folded portion 100 in the primary airbag 70. To this end, the support airbag 76 can extend below the roof liner 72 a distance $L_2$ greater than the distance $L_1$. The support airbag 76 can extend to a position at or below the attachment points of the ends 112 of the tether 110 to the inner wall 102. Alternatively, the lower end 122 can be positioned at or above the folded portion 100 (now shown), in which case the distance $L_2$ will be equal to or less than the distance $L_1$.

As noted, there is no vehicle structure in position to act as a reaction surface to constrain movement of the deployed primary airbag 70. The support airbag 76 deploys into the cabin 40 at a location forward of the primary airbag 70 (as shown in FIG. 3A). It will be appreciated that the support airbag 76 associated with a seat 50 in the front row 52 will deploy into the cabin 40 at a location rearward of the associated primary airbag 70 (not shown). In each case, the primary airbag 70 is located between the associated occupant 60 and the support airbag 76.

Since the inflator 78 supplies inflation fluid to the support airbag 76 at a greater pressure than the inflation fluid pressure supplied by the inflator 74 to the primary airbag 70, the deployed support airbag is stiffer and more resistant to movement than the deployed primary airbag. The example configuration shown in FIG. 3A therefore requires no interaction with forward structure of the vehicle 20, such as an instrument panel, steering wheel or seat to provide a reaction surface for the primary airbag 70.

Figure 4:
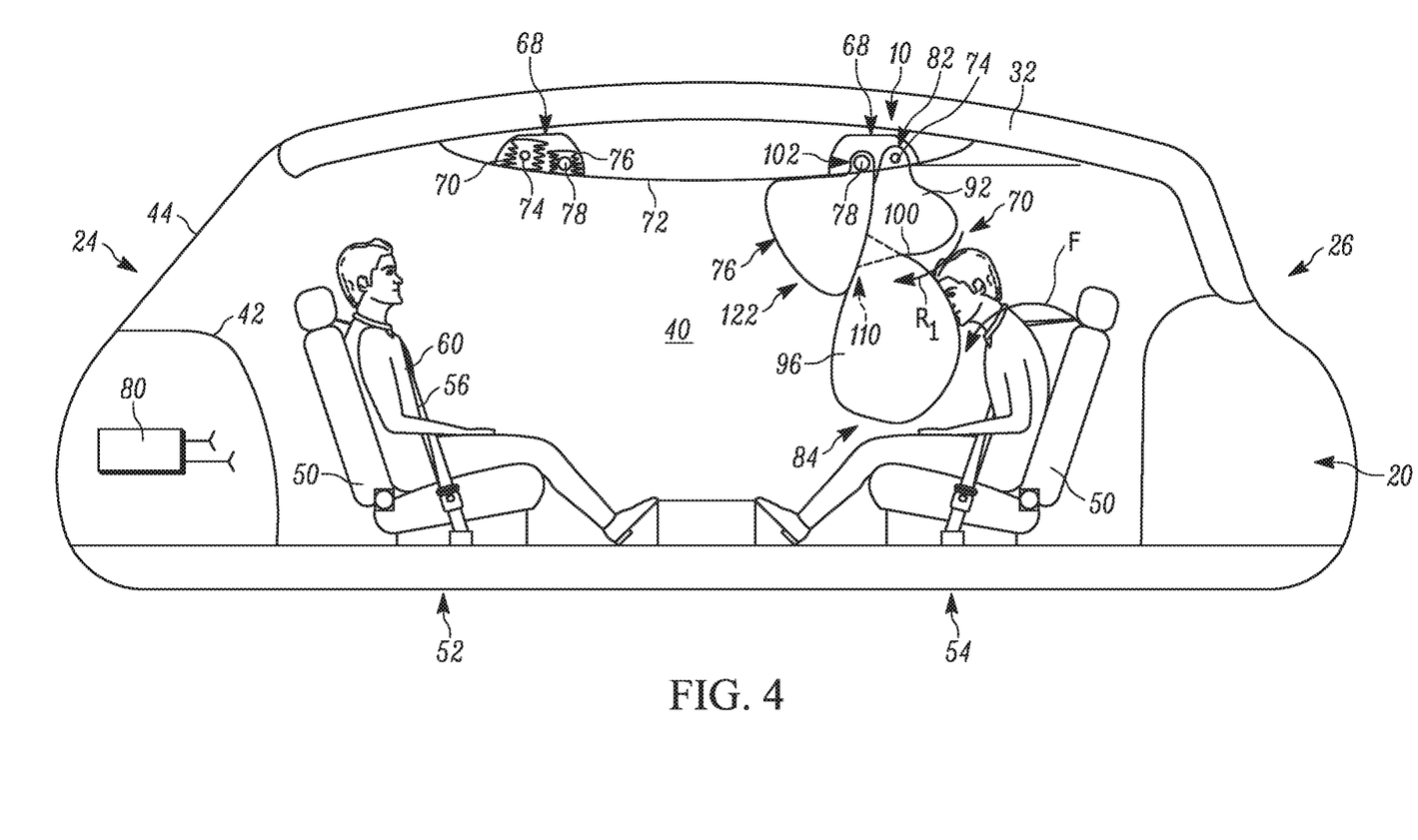
FIG. 4 is a schematic illustration of the cabin of the vehicle following occupant penetration into the deployed airbags.

Because the occupant 60 is belted, a frontal crash resulting in forward occupant movement causes the occupant to bend at the waist and follow an angled or arcuate path toward the airbag 70, as indicated generally by the arrow F in FIG. 3A. Once the moving occupant 60 engages the inflated lower portion 96 (FIG. 4), the primary airbag 70 is urged to move in the direction F. Since the support airbag 76 is positioned forward of and pressurized to a greater pressure than the primary airbag 70, the primary airbag is prevented from moving in the direction F. In other words, the support airbag 76 restricts movement of the primary airbag 70 away from the occupant 60. This is facilitated by the fact that the support airbag 76 abuts or quickly moves into engagement with the roof liner 72 when the primary airbag 70 attempts to move in the direction F. More specifically, the support airbag 76 is prevented from rotating in the clockwise direction about the inflator 78 when the primary airbag 70 moves in the direction F.

The length $L_2$ of the support airbag 76 can be adjusted to tailor how the support airbag interacts with the primary airbag 70. Increasing the length $L_2$ provides a reaction surface for a larger portion of the primary airbag 70. On the other hand, decreasing the length $L_2$ provides a reaction surface for a smaller portion of the primary airbag 70.

Figure 5A:
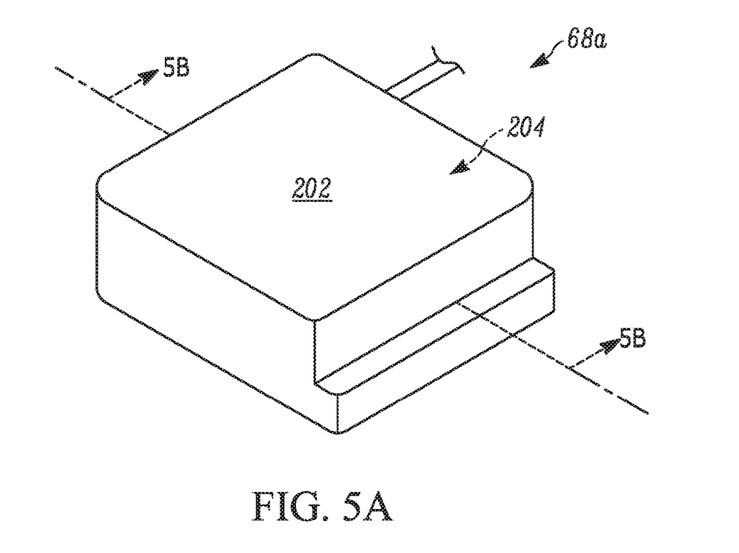
FIG. 5A is a side view of an airbag module of another example occupant restraint system.
Figure 5B:
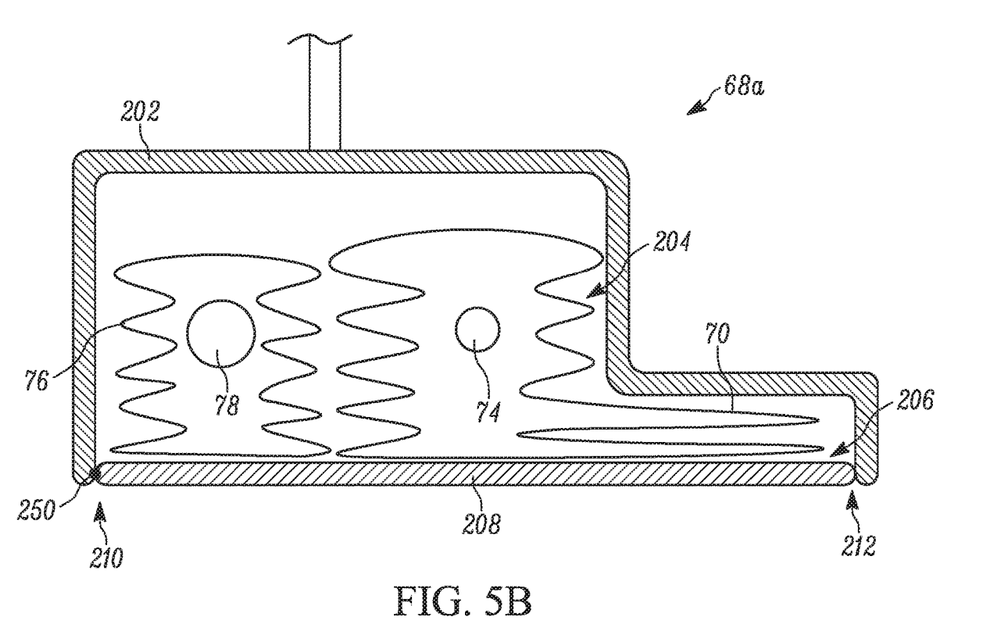
FIG. 5B is a section view taken along line 5B-5B of FIG. 5A.
Figure 6A:
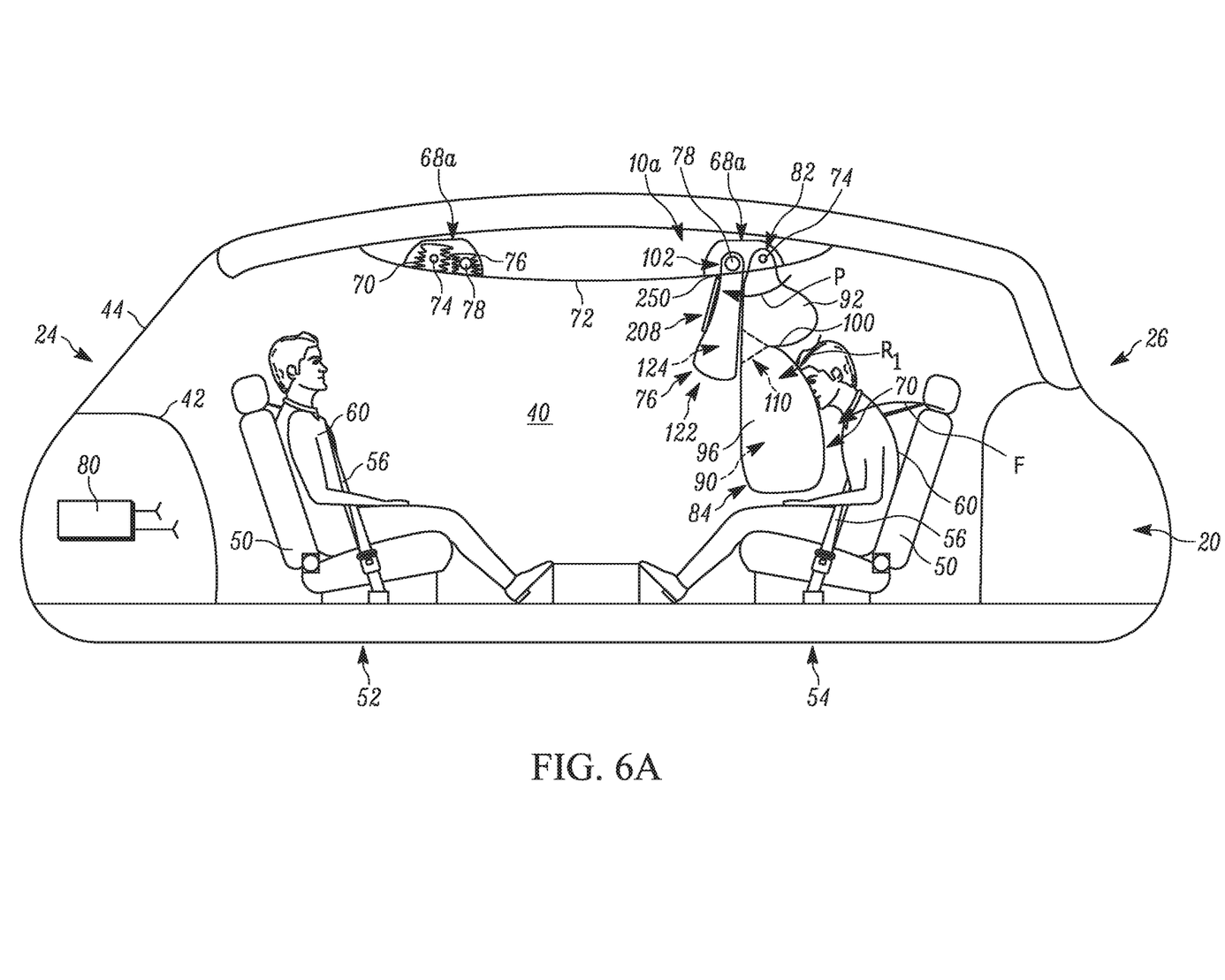
FIGS. 6A and 6B are schematic illustrations of the cabin of the vehicle with airbags of the airbag module of FIG. 5A in a deployed condition.
Figure 6B:
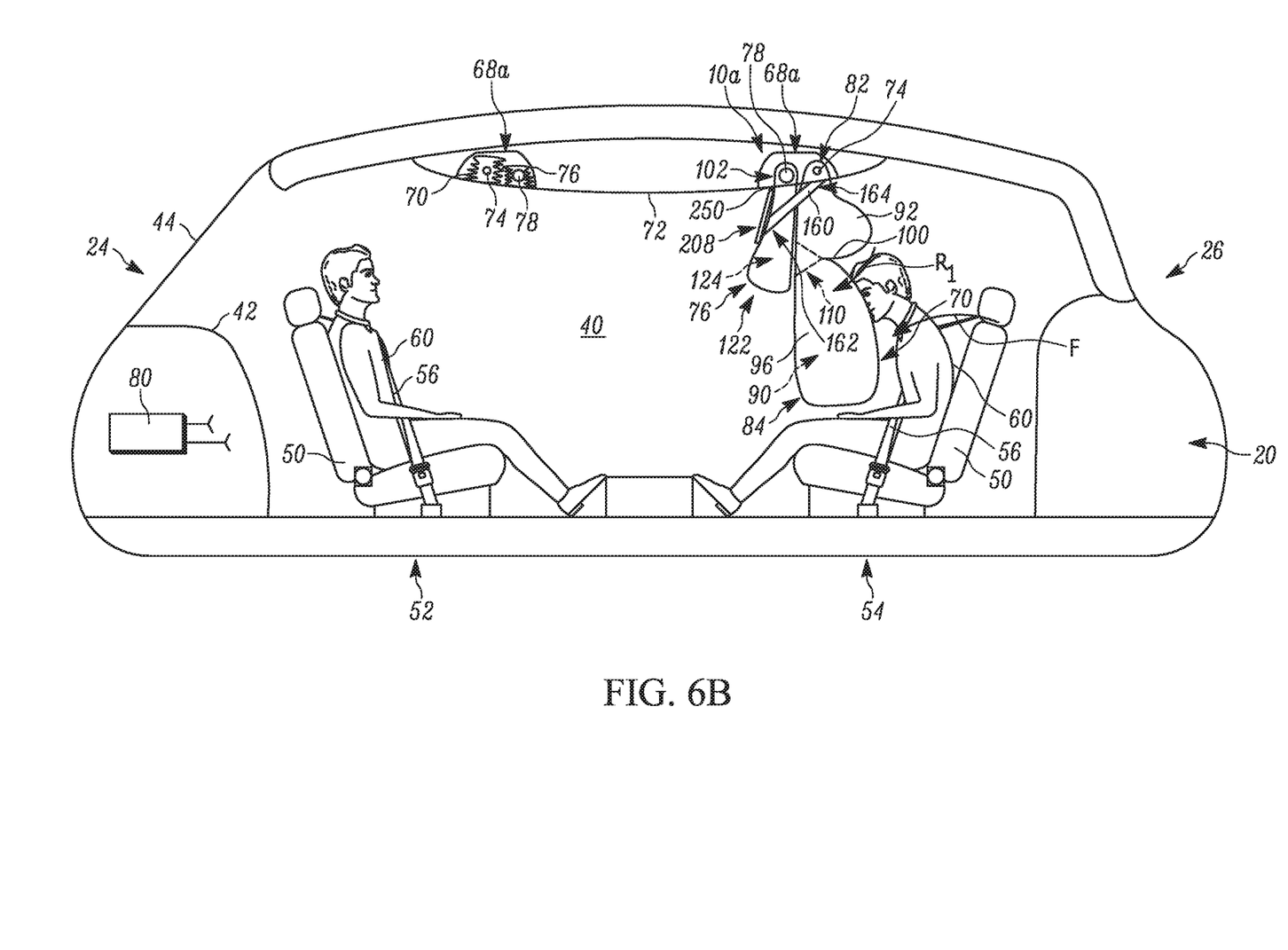

In another example occupant restraint system 10a shown in FIGS. 5A-6, the airbag module 68a includes a pivotable door 208 for providing additional support to the primary airbag 70 during deployment and occupant 60 penetration. Features in FIGS. 5A-6 identical to those in FIGS. 1-4 are given the same reference numeral while similar features are given the suffix "a". Referring to FIGS. 5A-5B, the module 68a can be generally rectangular or have another geometric shape. In any case, the module 68a includes a housing 202 defining a chamber 204. An opening 206 extends through the housing 202 and is in fluid communication with the chamber 204. The airbags 70, 76 are at least one of rolled and folded before being stored within the chamber 204. The inflators 74, 78 associated with the airbags 70, 76 are also positioned within the chamber 204 in fluid communication with the airbags.

The door 208 extends from a first end 210 pivotably connected at a hinge 250 to the housing 202 to a second end 212. The door 208 has an initial condition closing the opening 206 and cooperating with the housing 202 to enclose the airbags 70, 76. The door 208 can be part of the roof liner 72 or a separate component connected to the housing 202. The primary airbag 70 is positioned closer to the second end 212 of the door 208. The support airbag 76 is positioned closer to the first end 210 of the door 208.

As shown in FIG. 6A, when the inflators 74, 78 are actuated the inflating airbags 70, 76 exert a force on the door 208, which causes the door to move to an open condition. This releases the airbags 70, 76 to inflate from their stored conditions in the housing 202 to the deployed conditions within the cabin 40. In particular, the deploying airbags 70, 76 force the door 208 to pivot in the direction indicated generally at P away from the occupant 60 in the rear row 54. This pivoting allows each airbag 70, 76 to inflate and deploy downward (as shown) towards the seat 50 in the rear row 54 and forward of the occupant 60 in that seat.

Deployment of the primary airbag 70 towards the rear row 54 is limited by a combination of the support airbag 76 and the pivoted door 208. The hinge 250 connection between the door 208 and the housing 202 is such that the door pivots a predetermined degree in the manner P before stopping and providing a reaction surface for the support airbag 76 deploying adjacent and rearward of the door. The support airbag 76, in turn, provides the reaction surface for the primary airbag 70 deploying adjacent and rearward of the support airbag. The door 208 therefore restricts movement of the support airbag 76, which restricts movement of the primary airbag 70. This helps the primary airbag 70 deploy in the prescribed manner in front of the associated forward-facing occupant 60 in the rear row 54. In one example, the door 208 pivots about 90° in the manner P from the initial condition shown in FIG. 5B closing the opening 206. The strength of the hinge 250 can be increased (e.g., by reinforcement) or decreased in order to provide the desired degree of resistance to the deploying airbags 70, 76.

It is clear from the above that in the occupant restraint system 10a the door 208, hinge 250, and support airbag 76 cooperate to supply a reaction surface for the deploying primary airbag 70 in lieu of the reaction surface normally supplied by the existing vehicle architecture (e.g., instrument panel or windshield). It will be appreciated that the door 208 can alternatively be formed by a portion of the roof 32, roof liner 72 or header of the vehicle 20 (not shown) instead of being a separate component. The door 208 can also be secured to and be pivotable about the roof liner 72 or header.

In a modified example of the occupant restraint system 10a shown in FIG. 6B, one or more inextensible tethers or straps 160 provide additional restraint to the deploying primary airbag 70. Each tether 160 includes a first end 162 secured to the door 208 and a second end 164 secured to the housing 202. The straps 160 can be secured to opposite sides of the door 208 and limit pivotal movement of the door in the manner P to a predetermined degree (e.g., about 90° in the manner P). The length and attachment points of the straps 160 can be chosen to help ensure the airbags 70, 76 deploy in the prescribed manner. In other words, the tethers 160 can assist the door 208 in acting as a reaction surface for the deploying airbags 70, 76.

Figure 7:
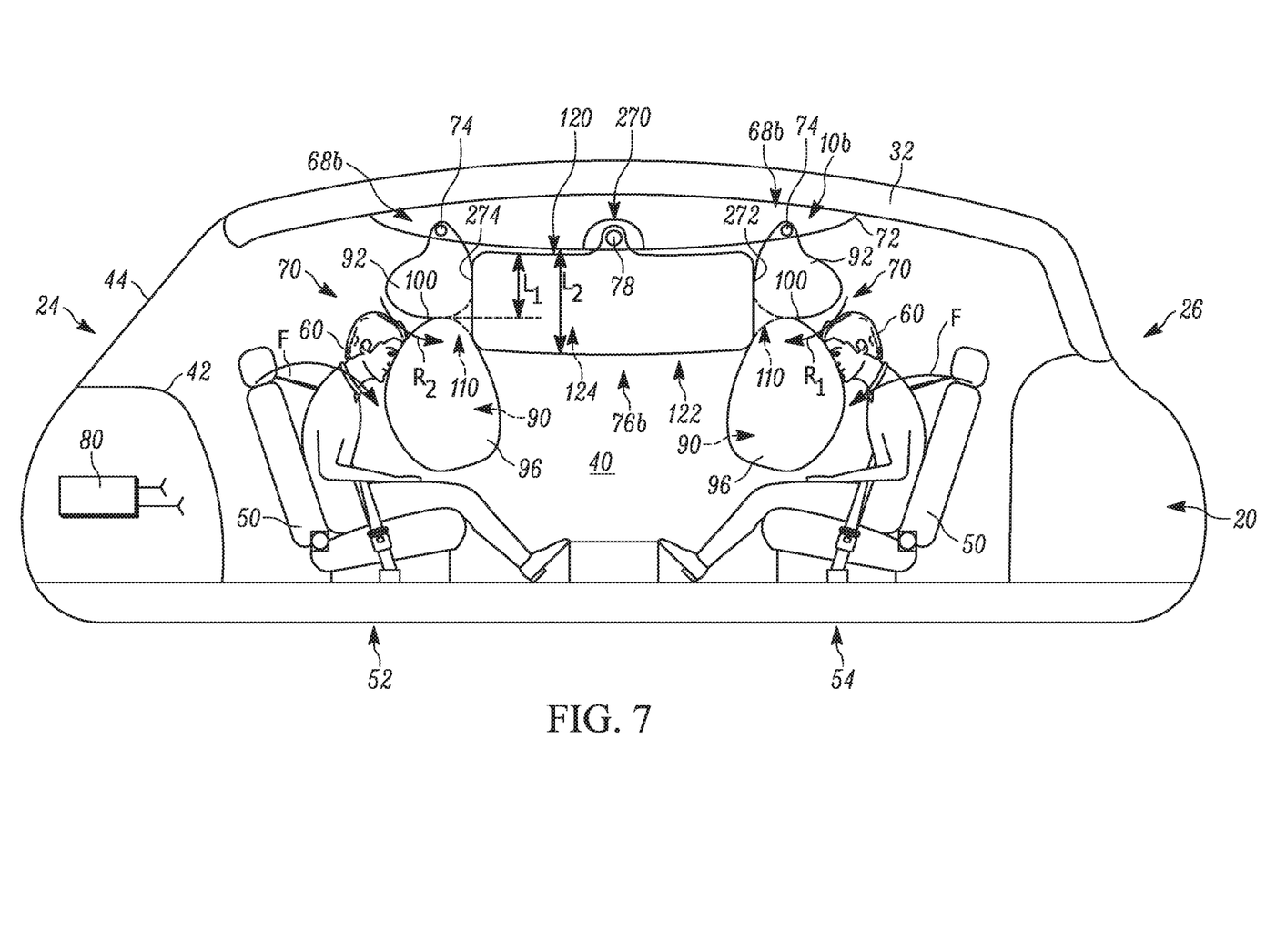
FIG. 7 is a schematic illustration of the cabin of the vehicle with another example occupant restraint system following occupant penetration into the deployed airbags.

In another example shown in FIG. 7, the occupant restraint system 10b is configured to help protect occupants 60 in either the front row 52 or the rear row 54 depending on the nature of the crash (e.g., frontal impact or rear impact). Features in FIG. 7 identical to those in FIGS. 1-4 are given the same reference numeral while similar features are given the suffix "b". The occupant restraint system 10b includes a pair of primary airbags 70 each supported by a single support airbag 76b positioned therebetween. As shown, the rearward primary airbag 70 is provided in an airbag module 68b located behind the roof liner 72 and closer to the second end 26 of the vehicle 20. The forward primary airbag 70 is provided in an airbag module 68b located behind the roof liner 72 and closer to the first end 24 of the vehicle 20. Separate inflators 74 are provided in each airbag module 68b for supplying inflation fluid to each respective primary airbag 70. The inflators 74 supply inflation fluid to the primary airbags 70 at the same first fluid pressure.

The support airbag 76b is provided in an airbag module 270 located behind the roof liner 72 and between the airbag modules 68b. The support airbag 76b includes a rearward facing surface 272 for engaging the rearward primary airbag 70 and a forward facing surface 274 for engaging the forward primary airbag 70. The support airbag 76b has the length $L_1$ from the roof liner 72 when deployed. The inflator 78 is provided in the airbag module 270 and supplies inflation fluid to the support airbag 76b at a third inflation fluid pressure higher than the first fluid pressure.

The primary airbags 70 are symmetrically arranged in the vehicle 20 on opposite sides of the support airbag 76b such that the folded portions 100 extend towards one another and towards the support airbag. The rearward primary airbag 70 deploys to a position adjacent and aligned with the occupant 60 in the rear row 54. The forward primary airbag 70 deploys to a position adjacent and aligned with the occupant 60 in the front row 52.

The primary airbags 70 inflate to the same first fluid pressure and the support airbag 76b inflates to the third fluid pressure and, thus, the support airbag 76b is force-neutral prior to penetration of the occupants 60 into the primary airbags. Moreover, the deployed support airbag 76b is stiffer and more resistant to deformation than either of the deployed primary airbags 70 due to the higher third fluid pressure.

It will be appreciated that although both primary airbags 70 are shown deployed only the primary airbag associated with the rear row 54 will deploy and be supported by the deployed support airbag 76b when a frontal impact occurs. The primary airbag 70 associated with the front row 52 will not be deployed in a frontal impact. On the other hand, only the primary airbag 70 associated with the front row 52 will deploy and be supported by the deployed support airbag 76b when a rear impact occurs. The primary airbag 70 associated with the rear row 54 will not be deployed in a rear impact.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A restraint system for helping to protect an occupant of a vehicle having a roof and a cabin with a seat for the occupant, comprising:
   a primary airbag having a stored condition within the roof and being inflatable to a deployed condition extending into the cabin and aligned with the seat; and
   a support airbag having a stored condition within the roof and being inflatable to a deployed condition engaging the primary airbag;
   a first inflator for providing inflation fluid at a first inflation fluid pressure to the primary airbag; and
   a second inflator for providing inflation fluid at a second inflation fluid pressure greater than the first inflation fluid pressure to the secondary airbag,
   wherein the primary airbag and the support airbag are provided in a single airbag module, and
   wherein the airbag module includes a housing defining a chamber for receiving the primary airbag, the support airbag, the first inflator, and the second inflator, and an opening extending through the housing and being in fluid communication with the chamber and through which the primary and support airbags deploy.

2. The restraint system recited in claim 1, wherein the support airbag is inflatable with an inflation fluid pressure greater than an inflation fluid pressure of the primary airbag.

3. The restraint system recited in claim 1, wherein the primary airbag is positioned between the occupant and the support airbag.

4. The restraint system recited in claim 1, wherein the support airbag restricts movement of the primary airbag away from the occupant in response to occupant penetration into the primary airbag.

5. The restraint system recited in claim 1 further comprising a door pivotably connected to the housing for closing the opening, the door being pivotable away from the roof in response to deployment of the primary airbag to restrict movement of the primary airbag and the support airbag away from the occupant.

6. The restraint system recited in claim 5 further comprising a strap secured to the module and the door for limiting pivoting of the door during primary airbag deployment.

7. The restraint system recited in claim 5, wherein the door extends from a first end to a second end, a hinge connecting the first end to the housing for limiting the degree to which the door pivots during primary airbag deployment.

8. The restraint system recited in claim 1, wherein the primary airbag and the support airbag are provided in separate airbag modules.

9. The restraint system recited in claim 1 further comprising:
   a second primary airbag having a stored condition within the roof and being inflatable to a deployed condition extending into the cabin and aligned with a second seat for a second occupant;
   wherein the support airbag engages the second primary airbag in response to penetration of the second occupant into the second primary airbag.

10. The restraint system recited in claim 8, wherein the second primary airbag is positioned between the second occupant and the support airbag.

11. The restraint system recited in claim 8, wherein the support airbag restricts movement of the second primary airbag away from the second occupant in response to the second occupant penetration into the second primary airbag.

12. A restraint system for helping to protect an occupant of a vehicle having a roof and a cabin with a seat for the occupant, comprising:
   a primary airbag having a stored condition within the roof and being inflatable to a deployed condition extending into the cabin and aligned with the seat, the primary airbag including a first portion defining a first chamber, a second portion defining a second chamber, and a folded portion extending between the first and second portions and having an inverted condition;
   a tether connected to the folded portion and an inner wall of the primary airbag for maintaining the folded portion in the inverted condition during deployment of the primary airbag;
   a first inflator for providing inflation fluid to the primary airbag at a first fluid pressure;
   a support airbag having a stored condition within the roof and being inflatable to a deployed condition engaging the first portion of the primary airbag; and
   a second inflator for providing inflation fluid to the support airbag at a second fluid pressure greater than the first fluid pressure such that the support airbag restricts movement of the primary airbag away from the occupant in response to occupant penetration into the primary airbag,
   wherein the primary airbag and the support airbag are provided in a single airbag module, and
   wherein the airbag module includes a housing defining a chamber for receiving the primary airbag, the support airbag, the first inflator, and the second inflator, and an opening extending through the housing and being in fluid communication with the chamber and through which the primary and support airbags deploy.

13. The restraint system recited in claim 12 further comprising a door pivotably connected to the housing for closing the opening, the door being pivotable away from the roof in response to deployment of the primary airbag to restrict movement of the primary airbag and the support airbag away from the occupant.

14. The restraint system recited in claim 13 further comprising a strap secured to the module and the door for limiting pivoting of the door during primary airbag deployment.

* * * * *